(12) United States Patent
Ellmore et al.

(10) Patent No.: US 10,304,625 B2
(45) Date of Patent: May 28, 2019

(54) CAPACITIVE STRUCTURE

(71) Applicant: KNOWLES (UK) LIMITED, Norwich (GB)

(72) Inventors: Angie Ellmore, Norwich (GB); Matthew Ellis, Norwich (GB)

(73) Assignee: Knowles (UK) Limited, Norwich (GB)

( * ) Notice: Subject to any disclaimer, the term of this patent is extended or adjusted under 35 U.S.C. 154(b) by 621 days.

(21) Appl. No.: 14/407,388

(22) PCT Filed: Jun. 10, 2013

(86) PCT No.: PCT/EP2013/061918
§ 371 (c)(1),
(2) Date: Dec. 11, 2014

(87) PCT Pub. No.: WO2013/186172
PCT Pub. Date: Dec. 19, 2013

(65) Prior Publication Data
US 2015/0146343 A1    May 28, 2015

(30) Foreign Application Priority Data

Jun. 11, 2012  (GB) .................................. 1210261.2

(51) Int. Cl.
*H01G 2/10* (2006.01)
*H01G 4/30* (2006.01)
*H01G 4/38* (2006.01)

(52) U.S. Cl.
CPC .............. *H01G 2/103* (2013.01); *H01G 4/30* (2013.01); *H01G 4/385* (2013.01)

(58) Field of Classification Search
CPC .. H01G 4/30; H01G 4/12; H01G 4/28; H01G 4/005; H01G 4/08; H01G 4/012; H01G 2/10; H01G 2/103
See application file for complete search history.

(56) References Cited

U.S. PATENT DOCUMENTS 4,819,128 A    4/1989  Florian et al.
5,835,338 A *  11/1998 Suzuki ..................... H01G 4/30
                                                      361/301.4
(Continued)

FOREIGN PATENT DOCUMENTS

CN    1180908 A    5/1998
CN    1275237      8/1998
(Continued)

OTHER PUBLICATIONS

International Search Report for PCT/EP2013/061918 in 3 pages.
(Continued)

*Primary Examiner* — Nguyen T Ha
(74) *Attorney, Agent, or Firm* — Foley & Lardner LLP (57) ABSTRACT

The invention relates to a capacitive structure comprising: first and second components, at least one component comprising a plurality of capacitive layers of a dielectric, each layer arranged between electrodes of different polarity, wherein the first and second components are arranged in a stack separated by a stress reducing layer having a supporting structure with an open mesh in which air acts to reduce the transmissibility of cracks through the stress reducing layer.

22 Claims, 6 Drawing Sheets

(56) References Cited

U.S. PATENT DOCUMENTS

| | | | |
|---|---|---|---|
| 6,133,820 A * | 10/2000 | Duggal | H01C 7/102 |
| | | | 338/114 |
| 6,607,934 B2 | 8/2003 | Chang et al. | |
| 6,741,434 B1 | 5/2004 | Sato et al. | |
| 7,358,207 B2 | 4/2008 | Tamura et al. | |
| 7,502,631 B2 | 3/2009 | Hashemi et al. | |
| 7,781,357 B2 | 8/2010 | Abe et al. | |
| 9,847,176 B2 | 12/2017 | Albertsen et al. | |
| 2004/0084131 A1 | 5/2004 | Konoue et al. | |
| 2004/0233612 A1 * | 11/2004 | Sugimoto | H01G 4/12 |
| | | | 361/312 |
| 2005/0212615 A1 | 9/2005 | Liang et al. | |
| 2006/0238073 A1 | 10/2006 | Ragossnig et al. | |
| 2008/0084651 A1 * | 4/2008 | Oguni | H01G 4/012 |
| | | | 361/303 |
| 2008/0224572 A1 | 9/2008 | Dollgast et al. | |
| 2009/0080144 A1 | 3/2009 | Matumoto et al. | |
| 2009/0220765 A1 | 9/2009 | Okamura et al. | |
| 2009/0273882 A1 * | 11/2009 | Park | H01G 4/008 |
| | | | 361/305 |
| 2010/0135937 A1 | 6/2010 | O'Brien et al. | |
| 2011/0007115 A1 | 1/2011 | Kobayashi et al. | |
| 2011/0074249 A1 | 3/2011 | Sakashita et al. | |
| 2011/0141655 A1 * | 6/2011 | Jeong | H01G 4/005 |
| | | | 361/303 |
| 2011/0141660 A1 * | 6/2011 | Jeong | H01G 4/12 |
| | | | 361/321.4 |
| 2011/0241091 A1 | 10/2011 | Dubourdieu | |
| 2013/0335880 A1 * | 12/2013 | Masuda | H01G 4/005 |
| | | | 361/303 |
| 2014/0043722 A1 * | 2/2014 | Hirata | H01G 4/30 |
| | | | 361/301.4 |
| 2017/0069427 A1 | 3/2017 | Albertsen et al. | |

FOREIGN PATENT DOCUMENTS

| | | |
|---|---|---|
| CN | 1267895 | 8/2006 |
| CN | 101180693 A | 5/2008 |
| JP | H06 77022 A | 3/1994 |
| JP | 2009-076760 | 4/2009 |
| WO | WO2007/097460 | 8/2007 |

OTHER PUBLICATIONS

Search Report dated Aug. 29, 2016 in corresponding Chinese Application No. 201380030678.8, filed Jun. 10, 2013.

Chinese Office Action for Application No. 201380030678.8 dated Jul. 17, 2017 (14 Pages).

International Search Report and Written Opinion for Application No. PCT/EP2015/053549, dated May 4, 2015 in 8 pages.

Search and Examination Report for Application No. GB1403117.3, dated Jul. 30, 2015 in 6 pages.

* cited by examiner

CAPACITIVE STRUCTURE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates to a capacitive structure.

Description of the Related Art

Figure 1:
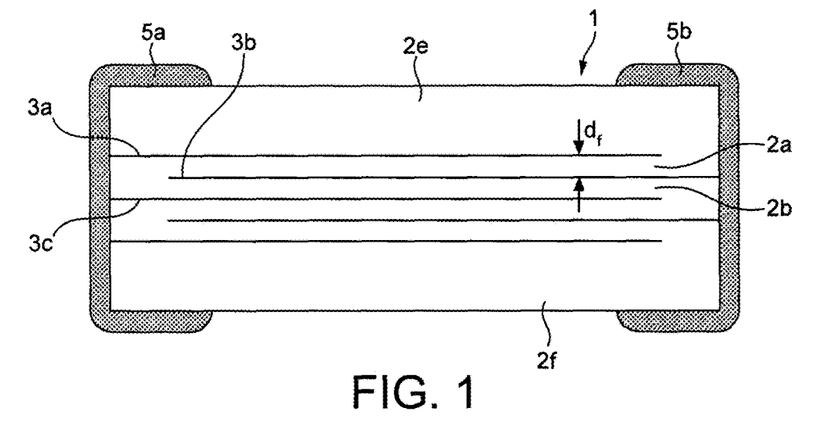
FIG. 1 illustrates a section through a known capacitive structure.

FIG. 1 is a cross-sectional view through one known stacked capacitor, of which there are many variants. The capacitor is formed of a plurality of capacitive layers $2a$, $2b$, etc., formed between respective electrode pairs of opposing polarities. For example, the layer $2a$ lies between electrodes $3a$, $3b$, and the layer $2b$ lies between electrodes $3b$, $3c$, etc. In the illustrated structure, alternate electrodes are secured to respective end caps $5a$, $5b$. The overall depth of the capacitor is denoted d, and the thickness of each layer is denoted df. Where the combined thicknesses of the capacitive layers do not make up the full depth of the capacitor, bulk layers (illustrated as $2e$ and $2f$) can be provided. The overall depth of the capacitor may for example be determined by a required external package size.

SUMMARY OF CERTAIN INVENTIVE ASPECTS

Although the present invention is concerned principally with capacitive structures which are formed of capacitive layers and which are intended to act as a capacitor, it will be appreciated from the following that the invention does not relate exclusively to capacitors, but extends to other structures which may implement another circuit function, or a combination of a capacitor and another circuit function. This is discussed in more detail in the following but for convenience sake, the term "capacitive structure" is used herein to denote a layered structure which includes at least some capacitive layers. The term "layered structure" does not imply any capacitive layers.

The capacitive layers are formed of a dielectric material, such as a ceramic, while the electrodes themselves can be formed of a suitable precious or base metal. The terminating caps $5a$, $5b$ can be of electroplated silver, electroplated copper, Pd/Ag or any suitable material.

There is an ongoing need to obtain the maximum possible capacitance of a stack capacitor structure of this type, at a maximum working voltage in a small as possible package size. Capacitance can be increased by increasing the electrode count (number of electrodes, $3a$, $3b$, etc), and/or increasing the spacing between electrodes (the layers thickness df to increase working voltage. There is however a trade-off between a maximum capacitive value achieved by a part, and the maximum working voltage. For example, at present, a structure of this type capable of operating at a voltage of 500V would deliver a maximum capacitance of about 0.5 µF. Conversely, parts of the capacitance value of 1 µF currently cannot exceed working voltages of around 200V. Moreover, it is important that capacitors are reliable, in that they should not fail over their intended lifetimes.

The inventors have devised a capacitive structure and a technique for forming the capacitive structure which allows these parameters to be modified, such that a part can deliver a higher capacitance at a higher working voltage, without significant failure rates.

According to an aspect of the present invention, there is provided a capacitive structure comprising: first and second components, at least one component comprising a plurality of capacitive layers of a dielectric, each layer arranged between electrodes of different polarity, wherein the first and second components are arranged in a stack separated by a stress reducing layer 18 (as illustrated or shown in FIGS. 2, 3, 4, 7, and 8) having a supporting structure with an open mesh in which air acts to reduce the transmissibility of cracks through the stress reducing layer 18.

In the following described embodiments, both of the first and second components have the structure of a plurality of layers of a dielectric, each layer arranged between electrodes of different polarity. Thus a capacitive part is formed. However, it is also possible to provide other electrical components in the stack, in place of a second capacitive component—for example, the component could be a varistor or inductive component. A still further possibility is that first and second components are a varistor or inductive component.

Still further possibilities include combining two different capacitor materials such as a low and high dielectric constant material or materials with differing properties with respect to operating parameters such as temperature.

Another aspect of the invention provides a method of making a capacitive structure comprising:

forming a first component comprising a plurality of capacitive layers of a dielectric, each layer arranged between electrodes of differing pluralities;

forming a second electrical component:

providing a stress reducing layer 18 between the first and second components to form a stack, the stress reducing layer 18 having a supporting structure with an open mesh in which air acts to reduce the transmissibility of cracks through the stress reducing layer.

The stress reducing layer 18 could be formed in a number of different ways, and according to the preferred embodiment which is described herein it is formed by forming a blended layer of an organic material, preferably particulate and a dielectric material between the first and second components, and sintering the structure so as to remove the organic particulate material, thereby leaving the open mesh.

When seeking to achieve the objective of the invention, that is to provide a part which can deliver a higher capacitance at a higher working voltage, the inventors had to contend with failures of the parts. For small chips and large, low voltage chips, product reliability is determined by material performance and manufacturing defect levels. The inventors have recognised that as chip size and working voltage increases, piezoelectric/electrostrictive stress cracking becomes important as an additional failure mechanism. In fact, the inventors have determined through repeated observation and analysis that piezoelectric/electrostrictive stress cracking eventually dominates the failure mechanism for large, higher voltage parts.

The stress reducing layer with an open mesh 18 (a sponge-like structure) has been found to significantly reduce the effect of failures by cracking. This has permitted the construction of a part with a maximum working voltage of 500V and a capacitive value of 1 µF in a chip referred to as 2220 which has dimensions of 0.22" (5.6 mm)×0.20" (5.1 mm) and which has hitherto not been possible with these types of capacitive structures.

A principle advantage of the present invention is that for any given working voltage a higher capacitance per unit volume can be achieved than has been the case before. The invention has a wide applicability over all voltages and capacitance values, for example, from around 200V (or even lower) up to possible working voltages of 6 KV (or even higher). It is expected that the benefit of the invention can be achieved through capacitance values over a wide range from a few pF to μFr.

The method of making the capacitive structure in accordance with the invention fits in very well with existing manufacturing techniques where capacitive layers are screen printed. Once the correct amount of ceramic layers have been put down, with the intervening electrodes for the first component, the blended layer can be formed over these layers, following by subsequent layers for the other component. The entire structure can then be fired or sintered in a single step, simultaneously sintering the dielectric material of the capacitive layers and "burning off" the particulate organic material to leave the open mesh or sponge structure.

In this technique, carbon is particularly effective as the organic particulate material although it is expected that other materials (such as corn flour) would achieve the same result.

It will also be apparent that there are other ways of achieving the required spongy structure, for example, by using a coarser version of the ceramic material which would not bond together well after sintering, thereby offering the same advantage of a weaker structure allowing absorption of electrical stress. Furthermore, it may not be necessary when a blended layer is used for the organic material to be particulate—a binder blend could achieve a similar effect.

One example of a capacitive structure with which the techniques of the present invention can be used is that shown in FIG. 1. However, the technique can be applied to a wide range of layered capacitive structures, for example, using sectional or floating electrode patterns. Moreover, the number of components in the part need not be restricted to two. It is possible to have more than two components, each separated from its adjacent component by an open mesh layer. This allows the thickness of each component to be reduced, thereby taking maximum advantage of properties of thinner "chips".

The capacitance value and maximum working voltage of the part is affected by a number of different parameters, including the following:

the number of electrodes, which is any suitable number but can typically lie between 20 and 100 and can extend up to 300;

the thickness of an inner bulk layer which can be provided to separate the components on either side of the stress reducing layer having a supporting structure with an open mesh 18—this could have a value for example, between 65 and 200 microns, and more preferably between 70 and 150 microns (these values are the fired values—the corresponding green value for 65μ fired is 90μ;

the thickness of open mesh layer itself, which can lie for example, between 10 and 200 microns, for example between 10 and 80 μm—values greater than 40 μm have been found to be preferred; and the thickness of the individual capacitive layers which can lie, for example, between 10 microns and 100 microns and can extend up to 200 μm. In one example, it lies between 30 microns and 40 microns.

(The above thicknesses are particularly appropriate for the 500 v/1 μF part).

The overall dimensions of the part can also play a part. Test parts which have been shown to deliver 1 μF at 500V have had a width of 5 mm, a length of 5.7 mm and thickness of 2.6 mm or 3.2 mm. It is expected that parts with dimensions in the following ranges would also be effective:

Length between 3.2 mm and 20.5 mm or between 2 and 25 mm;

Width between 1.6 mm and 15.5 mm or between 1 and 20 mm; and depth between 1.6 mm and 4 mm, or up to a maximum of at least 5 mm.

BRIEF DESCRIPTION OF THE DRAWINGS

For a better understanding of the present invention and to show how the same may be carried into effect, reference will now be made by way of example, to the accompanying drawings in which.

Figure 2:
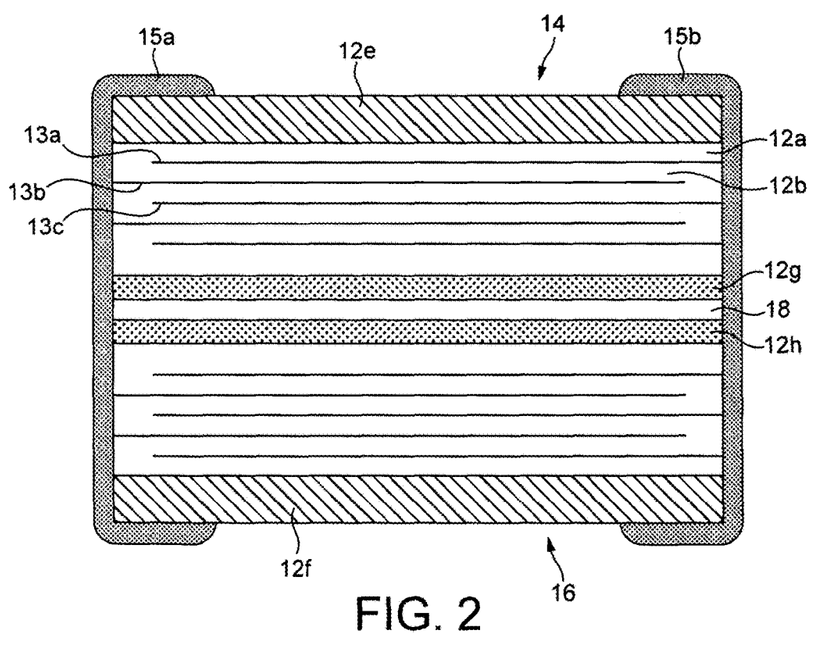
FIG. 2 illustrates a section through a structure in accordance with one embodiment of the present invention.
Figure 3:
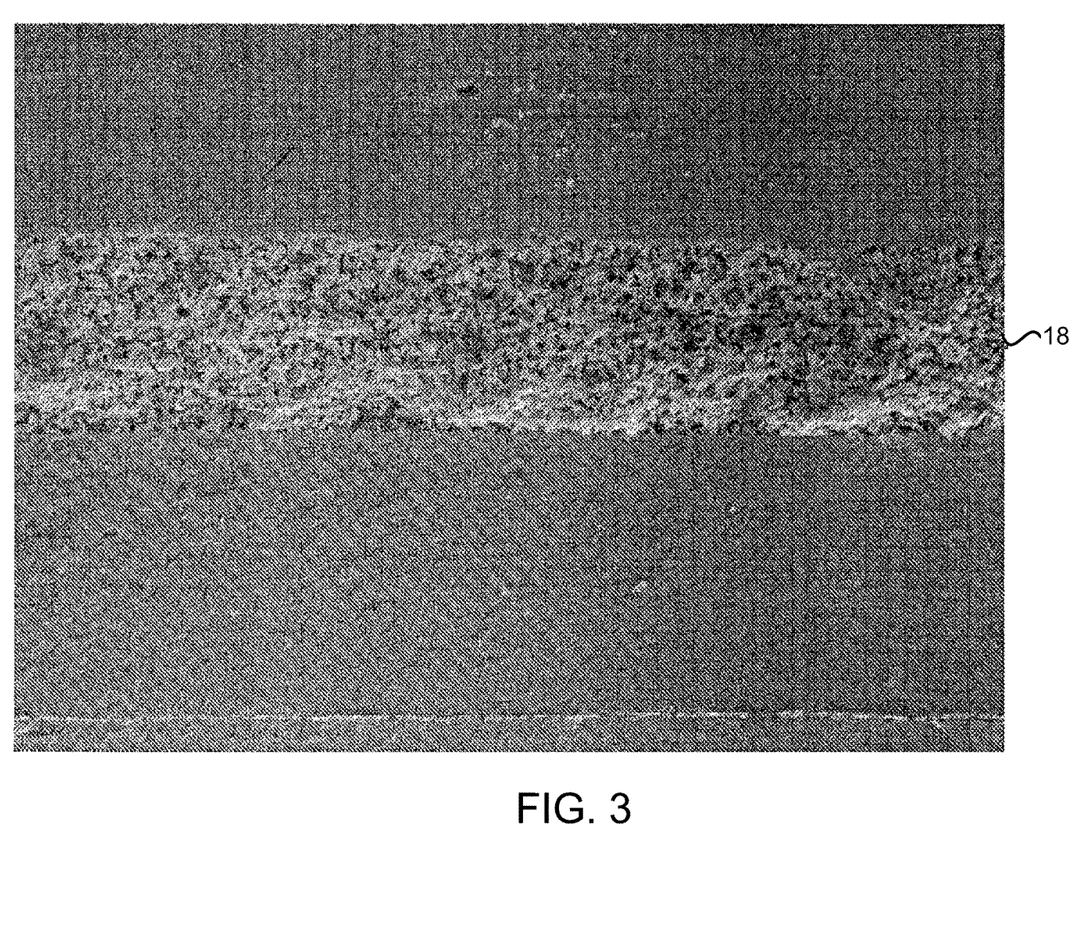
FIGS. 3 and 4 are SEM images showing the stress reducing layer having a supporting structure with an open mesh in two different magnifications.
Figure 4:
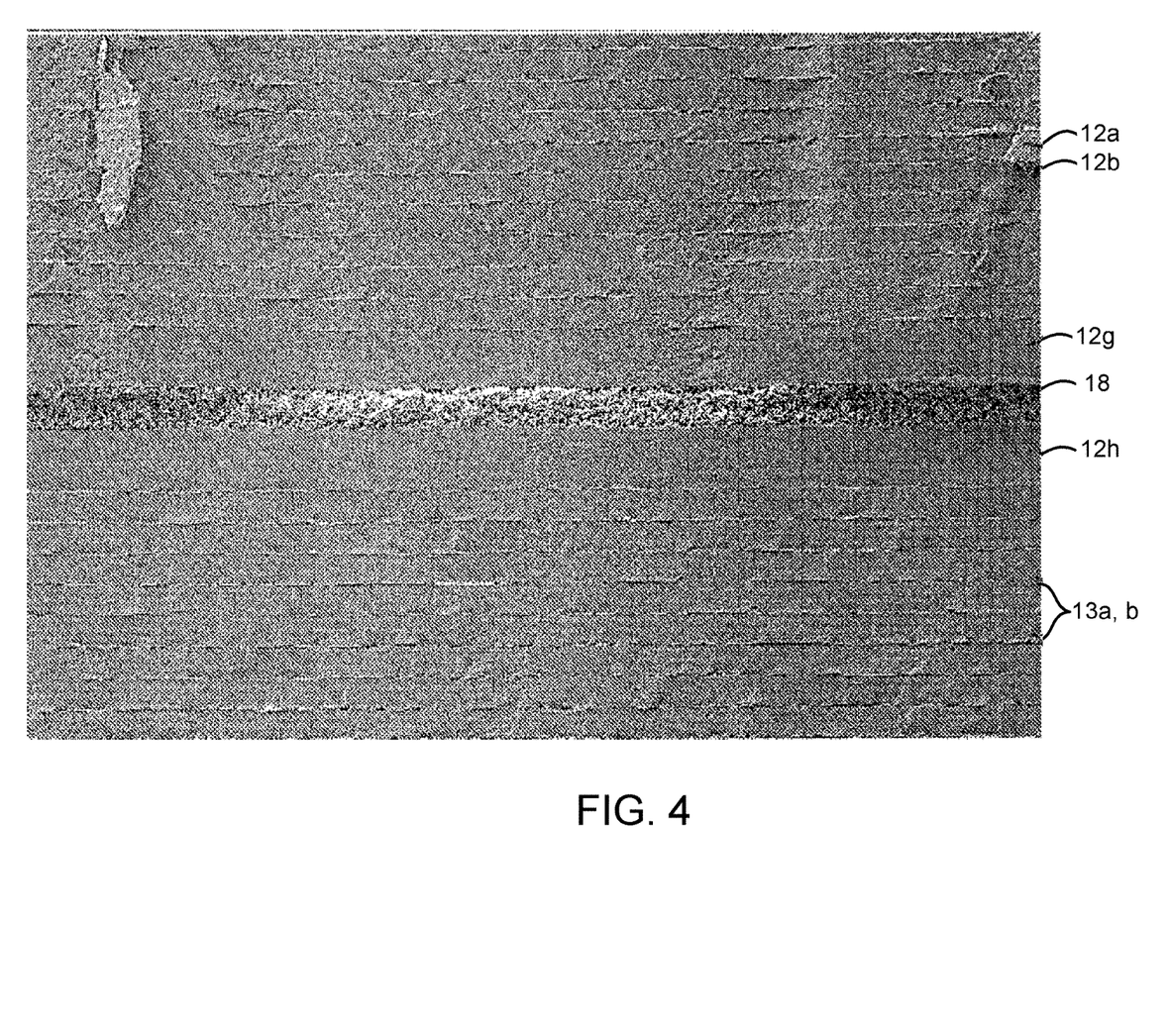

FIG. 2 illustrates a capacitive structure in accordance with one embodiment of the invention. The capacitor comprises ceramic capacitive layers 12a, 12b, etc., formed between pairs of electrodes 13a, 13b, 13c, etc. In this respect, the structure is somewhat similar to the structure shown in FIG. 1, and the principles of operation as a capacitor are the same. Of significant difference however is the fact that the capacitive structure of FIG. 2 comprises upper and lower components 14, 16, separated by a stress reducing layer having a supporting structure with an open mesh 18. The upper and lower parts 14, 16 are held in a common capacitive structure by end caps 15a, 15b, formed for example, of electroplated silver. If necessary, to make up the required depth of the capacitor, outer bulk layers 12e, 12f can be provided. Each component can also have an inner bulk layer 12g, 12h adjacent the stress reducing layer having a supporting structure with an open mesh 18. The stress reducing layer having a supporting structure with an open mesh 18 performs two important functions. It has sufficient physical structure to hold together the upper and lower parts, but also is sufficiently loose grained (mesh) that it can trap a sufficient quantity of air (open) to prevent cracks being transmitted and causing failure (stress reducing). Therefore, the dividing layer 18 may also be properly be referred as a stress reducing open mesh layer. This is described in more detail in the following, but it has been determined that a layer with a sponge construction is the most effective. FIG. 3 is an SEM of the stress reducing layer having a supporting structure with an open mesh 18 itself, showing how it differs from the ceramic layer on either side of it. FIG. 4 is a lower scale SEM which shows the stress reducing layer having a supporting structure with an open mesh 18 and also illustrates the ceramic layers 12a, 12b and electrodes 13a, 13b, etc.

DETAILED DESCRIPTION OF THE CERTAIN INVENTIVE EMBODIMENTS

Although the precise mechanism for reducing failure due to piezoelectric/electrostrictive cracks is not completely certain, it appears that stress is absorbed by the stress reducing layer having a supporting structure with an open mesh 18 (as illustrated or shown in FIGS. 2, 3, 4, 7, and 8) so that piezoelectric stress cracks do not form through the structure such as to cause failure. Thus, the capacitive structure can withstand significantly higher voltages and deliver a higher capacitive value, without failure, than has hitherto been possible. In particular, a 500V, 1 µF capacitor is now enabled in a single package, of 2220 chip size.

According to one method of manufacture, the capacitive structure is formed as a sequence of layers. That is, a first layer of ceramic is put down onto a base substrate (which might involve a number of layering steps by screen printing, for example), allowed to dry, an electrode layer is formed, followed by a subsequent ceramic layer, etc. When sufficient ceramic and electrode layers have been put down to form the lower component 16 of a capacitor structure, a blended layer is put down which comprises, in one embodiment, a blend of carbon and the base ceramic material. The upper component of the capacitive structure can then be formed in a similar manner to the lower component. In a sintering step which dries the layers, the carbon is burnt off leaving a weakened ceramic "spongy" stress reducing layer having a supporting structure with an open mesh 18. The resulting piece can then be cut into capacitive parts of the required dimensions.

The success of the above structure and technique in delivering a high voltage, high capacitance value structure which is resistant to failures is counterintuitive in that it provides a weaker layer at the centre of the capacitive structure. Nevertheless, the findings are impressive as set out in more detail later.

In seeking to develop a high voltage high capacitive failure-resistant structure, the inventors developed a useful understanding of piezoelectric/electrostrictive stress cracks which are formed when a high voltage is applied to a susceptible ceramic capacitor. The ceramic material is put under stress by the application of high voltage and a characteristic crack is formed, generally through the centre of the component. If the cracked component continues to be used with applied voltage, then an electrical failure will result, where the crack crosses opposing electrodes. This results in a short circuit condition arising as metal from the electrodes, for example, migrates through the crack and thereby allows an electrical short circuit.

If a part is susceptible to piezoelectric/electrostrictive cracking, then the crack can be generated at any stage of component use, i.e. at initial switch on, or during subsequent switching operations. Consequently, cracked components may not be detected at equipment test stage, but only later as field failures. Similarly, susceptible batches may be tested several times, generating widely different results, as crack formation is not always reproducible. It is thus a frustrating and hard to handle failure mechanism.

Prior to development of the present invention, the effect of piezoelectric/electrostrictive cracking as a failure mechanism was not sufficiently well understood to be incorporated into the normal design rules for designing multilayer ceramic capacitors. These rules sought to apply a minimum layer thickness between electrodes, expressed in volts per micron. This rule was thought to be applicable to a wide range of chip sizes and voltages, and generally speaking parts with higher capacitance values and lower working voltages could be manufactured by increasing the chip thickness to accommodate the increased specification. Chip thickness could be increased by increasing the thickness $d_f$ of the capacitive layers, increasing the number of electrodes (and thus the number of layers), or increasing the depth of the bulk layers.

It should also be understood that in addition to considering these rules, there are practical limitations imposed by the manufacture of capacitors, either by manufacturing techniques or by cost implications. For example, there is a maximum chip size that can sensibly be automatically manufactured. Attempts by the applicant to manufacture a 500V 1 µF capacitor within that maximum 2220 chip size, using the conventional V/u rules resulted in a part that failed due to piezoelectric/electrostrictive cracking.

Attempts were made to increase the thickness of the ceramic layers ($d_f$), in line with what was considered standard practice to reduce the V/u rating. The inventors noticed however that parts re-made with thicker layers still suffered from similar failure levels due to piezoelectric/electrostrictive cracking. Further increases in layer thicknesses offered no improvement.

Figure 5:
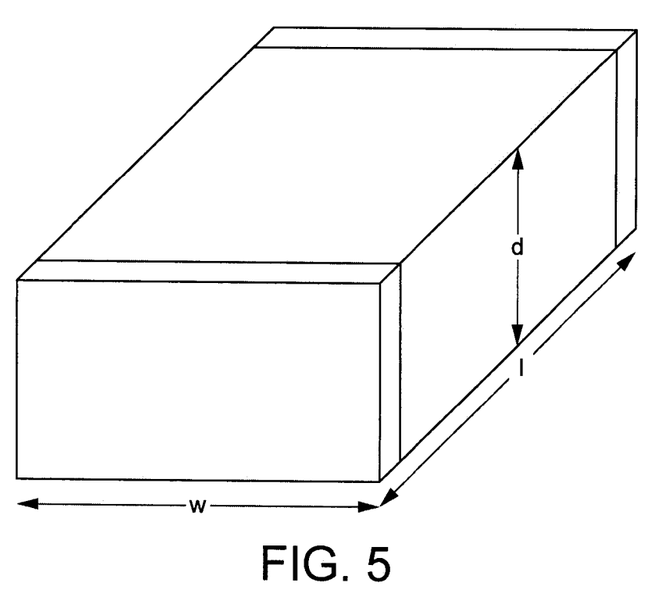
FIG. 5 is a schematic diagram of the external configuration of a capacitive part.

Following analysis, the inventors determined that failures due to piezoelectric/electrostrictive cracking were related to chip dimensions. Consider FIG. 5, which shows a capacitor having a depth d, with w and length 1. The inventors determined that large, thicker chips (large 1, large w, large d) were significantly more prone to failure than small thinner chips (small w, 1, and d), or even large thinner chips (large w, 1; small d). The inventors also noticed that the thicker the layer between electrodes ($d_f$) the more likely it was to induce piezoelectric/electrostrictive cracking.

Thus, the conventional rules would not permit the construction of a capacitive structure for large capacitance, high voltage components which were not prone to failure by cracking.

Figure 6:
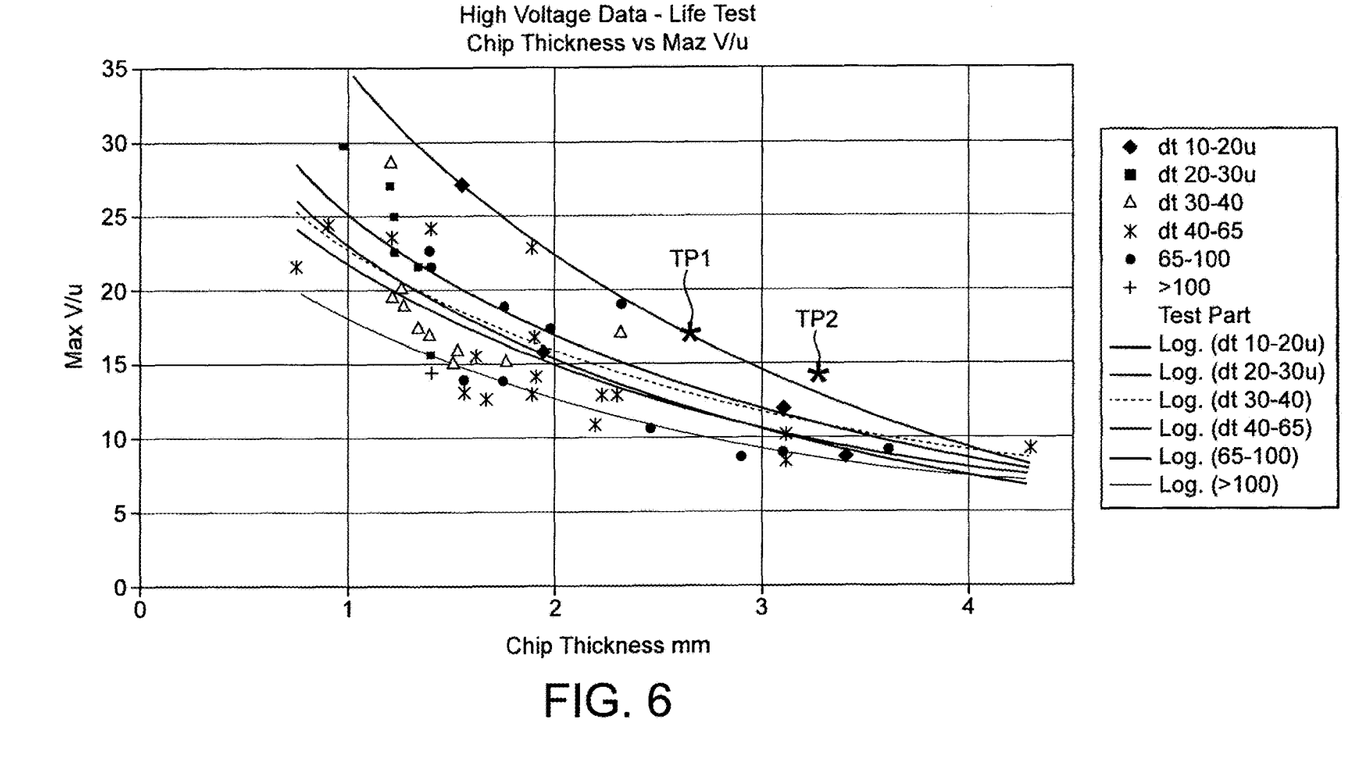
FIG. 6 is a graph showing data for designing a capacitor.

FIG. 6 illustrates a graph of maximum volts per micron (V/u) versus chip thickness in millimeters for a "2220" chip. As shown in the right-hand side of the graph, different geometrical icons represent different layer thicknesses. In order to form different overall chip thicknesses (as on the X scale of the graph), the number of electrodes, and thus the number of layers was adjusted.

Consider the data for a layer thickness between 30-40 microns, at a chip thickness of around 2.7 mm. At this point, the maximum volt per micron is around 12 using conventional design rules. Similarly, consider a structure with a layer thickness of between 30-40 microns, and a chip thickness of around 3.4 mm. The maximum volt per micron is around 11.

Consider now the two points marked with a star, labelled "TP1" (Test Part 1) and "TP2" (Test Part 2). Note that the maximum volts per micron for TP1 are around 17-18 (significantly higher than its conventional counterpart). The maximum volt per micron for TP2 is around 14, significantly greater than 12. In both cases, the part performs more like chips at least one millimeter thinner according to the conventional design strategy. More specific information on the test parts is given in the following.

The test parts (2 batches TP1/TP2) had the following construction based on fired measurements:
   a) Ceramic layers 210/250 microns
   b) 34 electrode and ceramic layers of 31/37 microns
   c) Ceramic layers of 62/74 microns
   d) 12 sponge layer prints (approx 50 microns)
   e) Ceramic layers of 62/74 microns
   f) 34 electrode and ceramic layers of 31/37 microns
   g) Ceramic layers 210/250 microns 1. Dimensions of Chip

|  | Length | Width | Thickness |
|---|---|---|---|
| Experimental parts TP1/TP2 | 5.7 mm | 5.0 mm | 2.6 mm/3.2 mm |

2. Thickness of each layer;

Experimental parts "green layer" (ceramic prior to sintering) thickness 37.5 and 44.5 microns, equates to fired layers of 31 and 37 microns approx.

3. Overall thickness of chip as above;

thickness of each stacked component of the finished chip was 1.3 mm (TP1) and 1.6 mm (TP2).

4. Materials;

The base ceramic (dielectric) material has $BaTiO_3$ as the primary ingredient, and is classified as an X7R material.

The stress reducing layer having a supporting structure with an open mesh 18 as present in the finished product is also made entirely of the base ceramic material ($BaTiO_3$ for test parts). The layer was made into a sponge by mixing the ceramic ink with carbon which after sintering formed the stress reducing layer having a supporting structure with an open mesh 18.

5. Blend Percentages

The ceramic sponge ink was made by blending 60% of our black coverplate ink (9.6% carbon) with 40% $BaTiO_3$ based dielectric ink (65% solids).

This gave an ink containing weight percentages 26% $BaTiO_3$ based dielectric, 5.8% carbon, 68.2% organic solvents plus binders.

The manufacturing process described above is a screen printing process.

A tape process would also be capable of producing the proposed parts. The tape process involves more stages to replace the screen printing stage, but other than this, the manufacturing processes are essentially the same.

Figure 7:
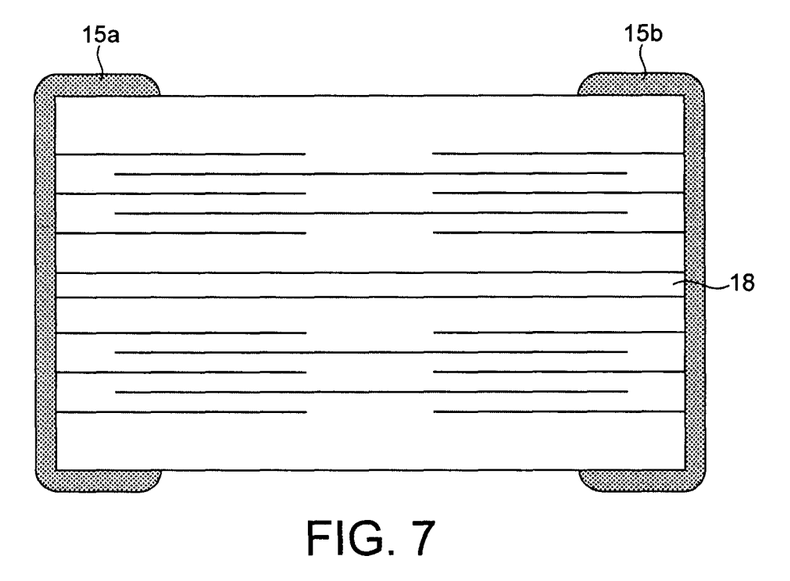
FIGS. 7 and 8 are alternate sectional capacitor designs.

FIG. 7 shows an alternate capacitor design in section. In FIG. 7, each component of the design has two sections, although 4, 6, 8, 10 and more sections are also possible. Sectional or floating electrode patterns are used for higher voltages, allowing voltage to be dropped across each section. There are many variants; according to one prior art variant, a two section screen at rated voltage 1 kV would have 500V across each section. A four section screen at 4 kV would have 1 kV across each section, etc.

Figure 8:
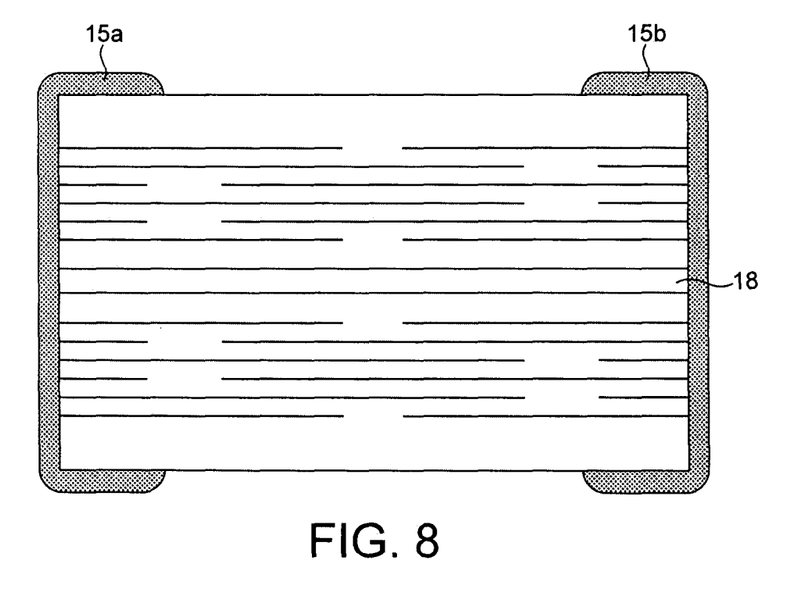

FIG. 8 shows a fractional capacitor design which is commonly used at mid voltages to reduce surface flashover.

It will be appreciated that while certain embodiments of the invention have been described, there is no intention to limit the invention to these embodiments as many variants are possible. In particular, although the 500V/1 μF/2220 part has been a part which has been particularly elusive in the industry, is readily apparent that the principles of the invention may be applied to parts of different working voltages, different capacitive values and of different dimensions. It is anticipated that the principles described herein will be widely applicable to improve the delivery of many different capacitive structures. For example, the following table gives a range of different parts to which the technique described herein can be applied.

TABLE I

| | Maximum capacitance values | | | | |
|---|---|---|---|---|---|
| Voltage | 1812 | 2220 | 3640 | 5550 | 8060 |
| 100 Vdc | — | — | — | 22 uF | 33 uF |
| 200/250 Vdc | 1.0 uF | 2.2 uF | 5.6 uF | 10 uF | 15 uF |
| 500 Vdc | 470 nF | 1.2 uF | 2.7 uF | 3.9 uF | 6.8 uF |
| 630 Vdc | 330 nF | 1.0 uF | 2.2 uF | 3.3 uF | 3.9 uF |
| 1 kVdc | 180 nF | 470 nF | 1.0 uF | 1.2 uF | 1.8 uF |
| 1.2 kVdc | 100 nF | 220 nF | 470 nF | 820 nF | 1.2 uF |
| 1.5 kVdc | 56 nF | 150 nF | 330 nF | 560 nF | 680 nF |
| 2 kVdc | N/a | 100 nF | 150 nF | 270 nF | 470 nF |
| 2.5 kVdc | — | — | — | 150 nF | 270 nF |
| 3 kVdc | — | — | — | 100 nF | 220 nF |
| 4 kVdc | — | — | — | 68 nF | 100 nF |

Furthermore, it is anticipated that the principles of the invention can be applied in a scenario where the first and second components are of different base ceramic materials having therefore different properties. Thus, it would be possible to produce a capacitive structure in which a first component had particularly good temperature resistant properties in one range, combined with a second component having particularly good temperature resistant properties in another range. In this way it would be possible to "blend" the characteristics of different ceramics to achieve a capacitive structure capable of operating over a wider range of variables than is presently possible.

In another variant, a lead is soldered to each termination of the capacitive structure. The structure can then be coated with a conformal coating to protect against environment/ voltage.

Furthermore, although the above discussion has focused on the capacitive structure, it is expected that the techniques discussed herein could be usefully extended to varistor and/or inductor structures.

The invention claimed is:

1. A capacitive structure comprising: first and second components, at least one component comprising a plurality of capacitive layers of a dielectric, each layer arranged between electrodes of different polarity, wherein the first and second components are arranged in a stack separated by a stress reducing layer having a supporting structure with an open mesh in which air acts to reduce the transmissibility of cracks through the stress reducing layer;
    wherein each component of the first and second components has a bulk dielectric layer forming an outer layer of the component; and
    wherein each component of the first and second components has an inner bulk layer adjacent the stress reducing layer.

2. A capacitive structure according to claim 1, comprising terminating caps at opposed ends of the stack, each cap extending the full depth of the stack, wherein at least some of the electrodes contact one of the terminating caps and at least some others of the electrodes contact the other of the terminating caps.

3. A capacitive structure according to claim 1, wherein the supporting structure is formed of a ceramic material.

4. A capacitive structure according to claim 3, wherein the dielectric layer is a ceramic material.

5. A capacitive structure according to claim 1, wherein the ceramic material of the supporting structure is formed of a ceramic material which is the same as a ceramic material of the dielectric.

6. A capacitive structure according to claim 5, wherein the ceramic material is an X7R dielectric material.

7. A capacitive structure according to claim 5, having a depth of between 1.6 mm and 4 mm.

8. A capacitive structure according to claim 1, wherein the first and second components have the same depth.

9. A capacitive structure according to claim 1, wherein each capacitive layer has a thickness of between 10 µm and 100 µm.

10. A capacitive structure according to claim 1, which has a maximum voltage of 500V and a capacitive value of 1 µF.

11. A capacitive structure according to claim 10, having a width between 3.2 mm and 20.5 mm, and a length between 1.6 mm and 15.5 mm.

12. A capacitive structure according to claim 1, wherein both of the first and second components comprise a plurality of capacitive layers of dielectric, each layer arranged between electrodes of different polarity, whereby the capacitive structure forms a capacitor.

13. A capacitive structure according to claim 1, wherein the first component comprises a plurality of capacitive layers of a dielectric, each layer arranged between electrodes of different polarity, and wherein the second component has a varistor or inductive characteristic.

14. A capacitive structure according to claim 1, comprising at least one further component, separated from an adjacent one of the first and second components by a further stress reducing layer.

15. A method of making a capacitive structure comprising:
    forming a first electrical component comprising a plurality of capacitive layers of a dielectric, each layer arranged between electrodes of differing polarities;
    forming a second electrical component:
    providing a stress reducing layer between the first and second electrical components to form a stack, the stress reducing layer having a supporting structure with an open mesh in which air acts to reduce the transmissibility of cracks through the stress reducing layer;
    providing each electrical component of the first and second electrical components with a bulk dielectric layer forming an outer layer of the electrical component; and
    providing each electrical component of the first and second electrical components with an inner bulk layer adjacent the stress reducing layer.

16. A method according to claim 15, wherein the second electrical component comprises a plurality of capacitive layers of a dielectric, each layer arranged between electrodes of different polarities.

17. A method according to claim 15, wherein the step of providing the stress reducing layer comprises forming a blended layer of an organic particulate material and a dielectric material between the first and second electrical components and sintering the structure so as to remove the organic material thereby leaving the open mesh.

18. A method according to claim 17, wherein the organic particulate material comprises carbon.

19. A method according to claim 15, wherein each of the plurality of capacitive layers is formed by screen printing a layer of ceramic ink and allowing to dry before a subsequent capacitive layer is formed.

20. A method according to claim 15, wherein the first and second electrical components are formed in a tape process.

21. A layered structure comprising: first and second components, at least one component comprising a plurality of layers of a dielectric, each layer arranged between electrodes, wherein the first and second components are arranged in a stack separated by a stress reducing layer having a supporting structure with an open mesh in which air acts to reduce the transmissability of cracks through the stress reducing layer;
    wherein each component has a bulk dielectric layer forming an outer layer of the component; and
    wherein each component has an inner bulk layer adjacent the stress reducing layer.

22. A layered structure according to claim 21 wherein each of the first and second components is selected from a capacitive component, a varistor component and an inductive component.

* * * * *